US008281470B2

(12) United States Patent
Orr

(10) Patent No.: US 8,281,470 B2
(45) Date of Patent: Oct. 9, 2012

(54) ESCUTCHEON INSTALLATION TOOL

(75) Inventor: Shawn G. Orr, Grand Rapids, MI (US)

(73) Assignee: The Viking Corporation, Hastings, MI (US)

(*) Notice: Subject to any disclaimer, the term of this patent is extended or adjusted under 35 U.S.C. 154(b) by 1032 days.

(21) Appl. No.: 12/112,257

(22) Filed: Apr. 30, 2008

(65) Prior Publication Data

US 2009/0271967 A1 Nov. 5, 2009

(51) Int. Cl.
*B23P 17/00* (2006.01)

(52) U.S. Cl. ............. 29/242; 29/271; 29/283; 81/53.11; 81/53.12

(58) Field of Classification Search .................... 29/242, 29/243, 270, 278, 271, 280, 283; 81/53.11, 81/53.12

See application file for complete search history.

(56) References Cited

U.S. PATENT DOCUMENTS

| | | | | |
|---|---|---|---|---|
| 2,637,587 | A * | 5/1953 | Robinson | 81/53.11 |
| 3,185,146 | A * | 5/1965 | Leopoldi | 600/553 |
| 5,148,723 | A * | 9/1992 | Newman et al. | 81/53.11 |
| 5,231,733 | A * | 8/1993 | Dittman | 16/412 |
| 5,809,850 | A * | 9/1998 | Tickner | 81/53.11 |
| 5,829,324 | A * | 11/1998 | Secor | 81/53.11 |
| 7,131,352 | B1 * | 11/2006 | Saunders | 81/53.11 |
| 7,234,743 | B2 * | 6/2007 | Robinson | 294/184 |
| 7,546,691 | B2 * | 6/2009 | Mackey | 33/613 |
| 2009/0266203 | A1 * | 10/2009 | Orr et al. | 81/64 |

OTHER PUBLICATIONS

Escutcheon Tool for Recessed Automatic Sprinklers, Globe Fire Sprinkler Corporation, Bulletin ASB-ESCTL, Rev. #2 (Aug. 2002) (1 page).

Mirage Concealed Cover Installer Tool, The Viking Corporation, New sprinkler bulletin, Form No. F_112007 (Dec. 7, 2007) (1 page).

* cited by examiner

*Primary Examiner* — Lee D Wilson

(74) *Attorney, Agent, or Firm* — Harness, Dickey & Pierce, P.L.C.

(57) ABSTRACT

An installation tool for installing an escutcheon on a sprinkler assembly includes an extension member and a body portion. The body portion may be disposed on an end of the extension member. The body portion may include a sleeve adjustably engaging a base. The body portion may also include a recess adapted to releasably receive an escutcheon. The installation tool is adapted to remotely install the escutcheon to a sprinkler assembly.

14 Claims, 6 Drawing Sheets

ESCUTCHEON INSTALLATION TOOL

FIELD

The present disclosure relates to an installation tool, and in particular, to an installation tool for installing an escutcheon for a fire protection sprinkler.

BACKGROUND

The statements in this section merely provide background information related to the present disclosure and may not constitute prior art.

Fire protection sprinklers are commonly mounted to ceilings of residential and commercial buildings. Such sprinklers are often housed within an opening in the ceiling in such a manner that the sprinkler head protrudes below the surface of the ceiling. A decorative escutcheon may be installed in the opening in the ceiling around the sprinkler head, improving the aesthetic qualities of the sprinkler system. In response to heat, the sprinkler trigger mechanism is activated to allow the sprinkler to discharge water below the ceiling.

Typically, a worker must stand atop a ladder or scaffolding to reach the opening in the ceiling to install the escutcheon. When installing escutcheons over multiple sprinklers, the worker must then climb down from the ladder or scaffolding, move the ladder or scaffolding below the next sprinkler, and climb back up to install the next escutcheon, repeating this process for each of the sprinklers in a given building. This process is time-consuming and costly.

SUMMARY

In one form, the present disclosure provides an installation tool for installing an escutcheon on a sprinkler assembly. The installation tool includes an extension member and a body portion. The body portion may be disposed on an end of the extension member. The body portion may include a base adjustably engaging a sleeve. The body portion may also include a recess adapted to releasably receive an escutcheon of a sprinkler assembly.

In another form, the present disclosure provides a tool for installing an escutcheon onto a sprinkler assembly including an elongated extension member and a body portion. The body portion may engage the extension member. The body portion may include a base and a sleeve. The sleeve may threadably receive the base, the sleeve being adjustable relative to the base to selectively arrange the body portion in any one of a plurality of positions. The sleeve may include a recess adapted to removably receive the escutcheon. The body portion is adapted to force the escutcheon into fixed engagement with the sprinkler assembly.

The present disclosure also provides a method for installing an escutcheon onto a sprinkler assembly and may include receiving a portion of said escutcheon within a recess disposed in a body portion of an installation tool, the body portion being disposed on an end of an extension member; aligning the escutcheon below the sprinkler assembly such that the escutcheon and the sprinkler assembly are disposed along a longitudinal axis of the extension member; applying a first force to the extension member in a first direction along the longitudinal axis of the extension member thereby remotely applying the first force to the escutcheon to press the escutcheon into engagement with the sprinkler assembly; and applying a second force to the extension member in a second direction along a longitudinal axis of the extension member to withdraw the body portion from the escutcheon.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
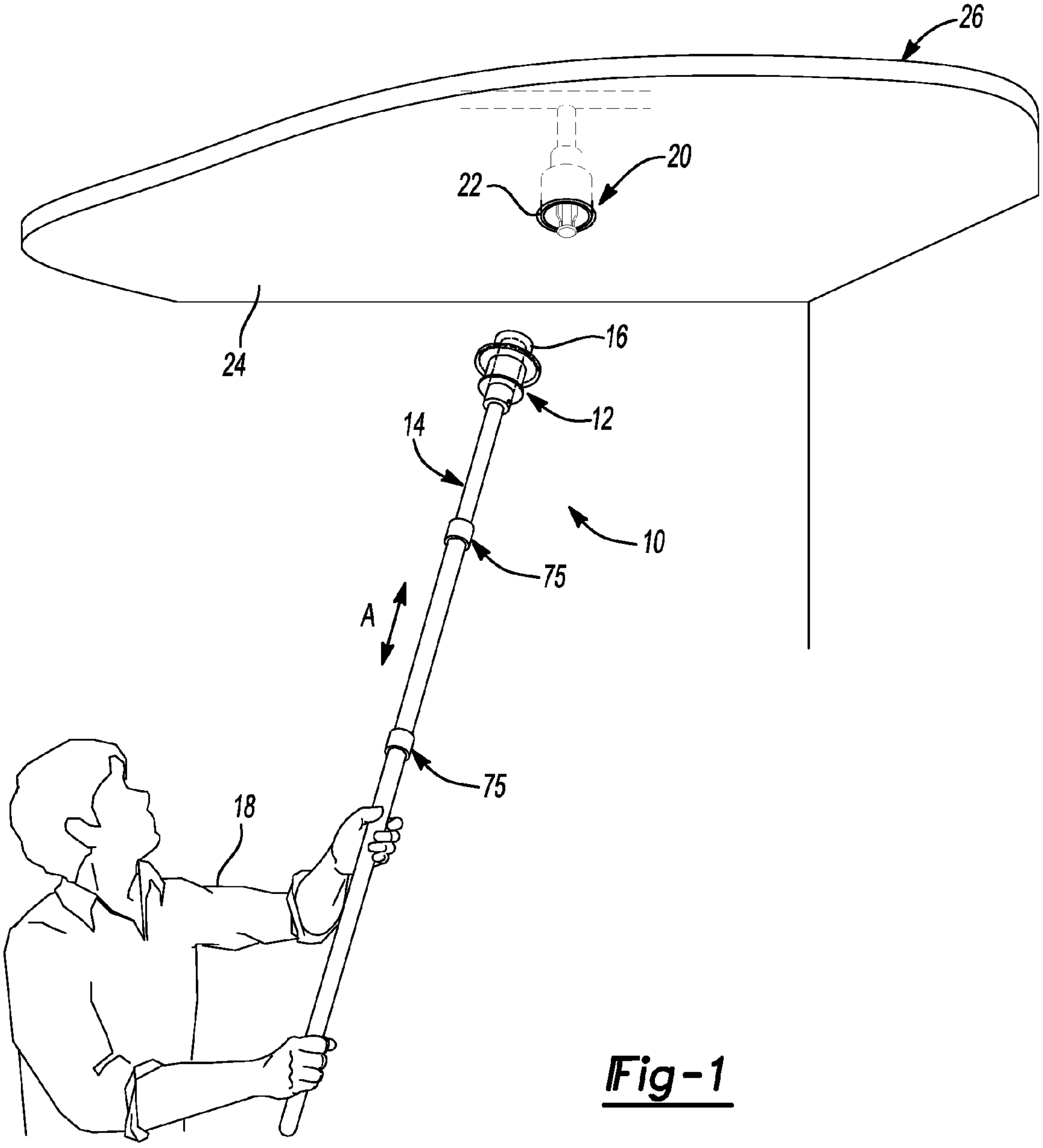
FIG. 1 is a partial perspective view of an operator installing an escutcheon with an installation tool according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-8, an installation tool 10 is provided and includes a body portion 12 and an extension member 14. The installation tool 10 may releasably engage an escutcheon 16 and extend the reach of an operator 18, allowing the operator 18 to install the escutcheon 16 onto a sprinkler assembly 20. The sprinkler assembly 20 may be installed within an opening 22 in a ceiling 24 of a building 26, for example. It should be appreciated that the sprinkler assembly 20 may be installed in a sidewall of the building 26, or any other location suited for an intended use of the sprinkler assembly 20.

Figure 2:
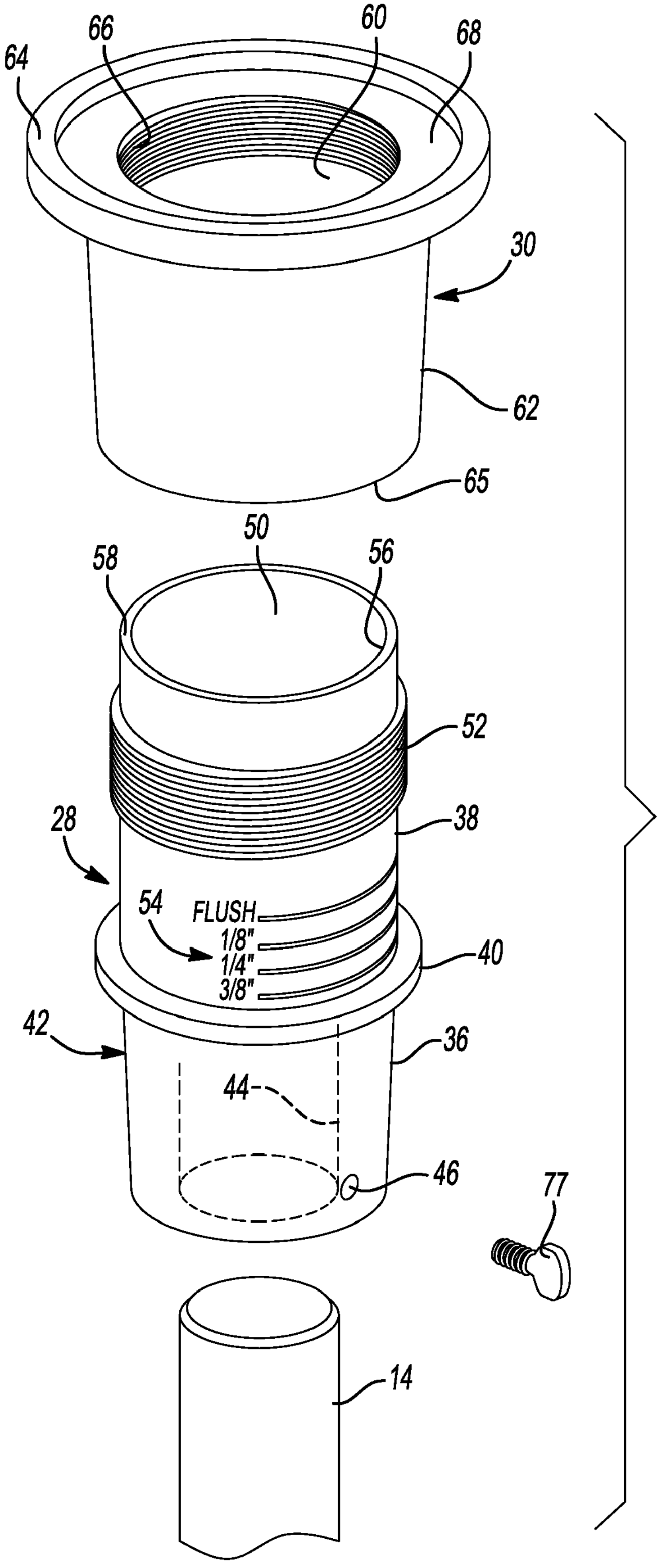
FIG. 2 is a partial exploded view of the installation tool shown in FIG. 1.

With reference to FIG. 2, the body portion 12 may include a base 28 and a sleeve 30. The base 28 may be a generally cylindrical body having a generally tubular cross section. The base 28 may include a lower portion 36, an upper portion 38, and an outer flange 40 disposed around an outer surface 42 of the base 28.

Figure 3:
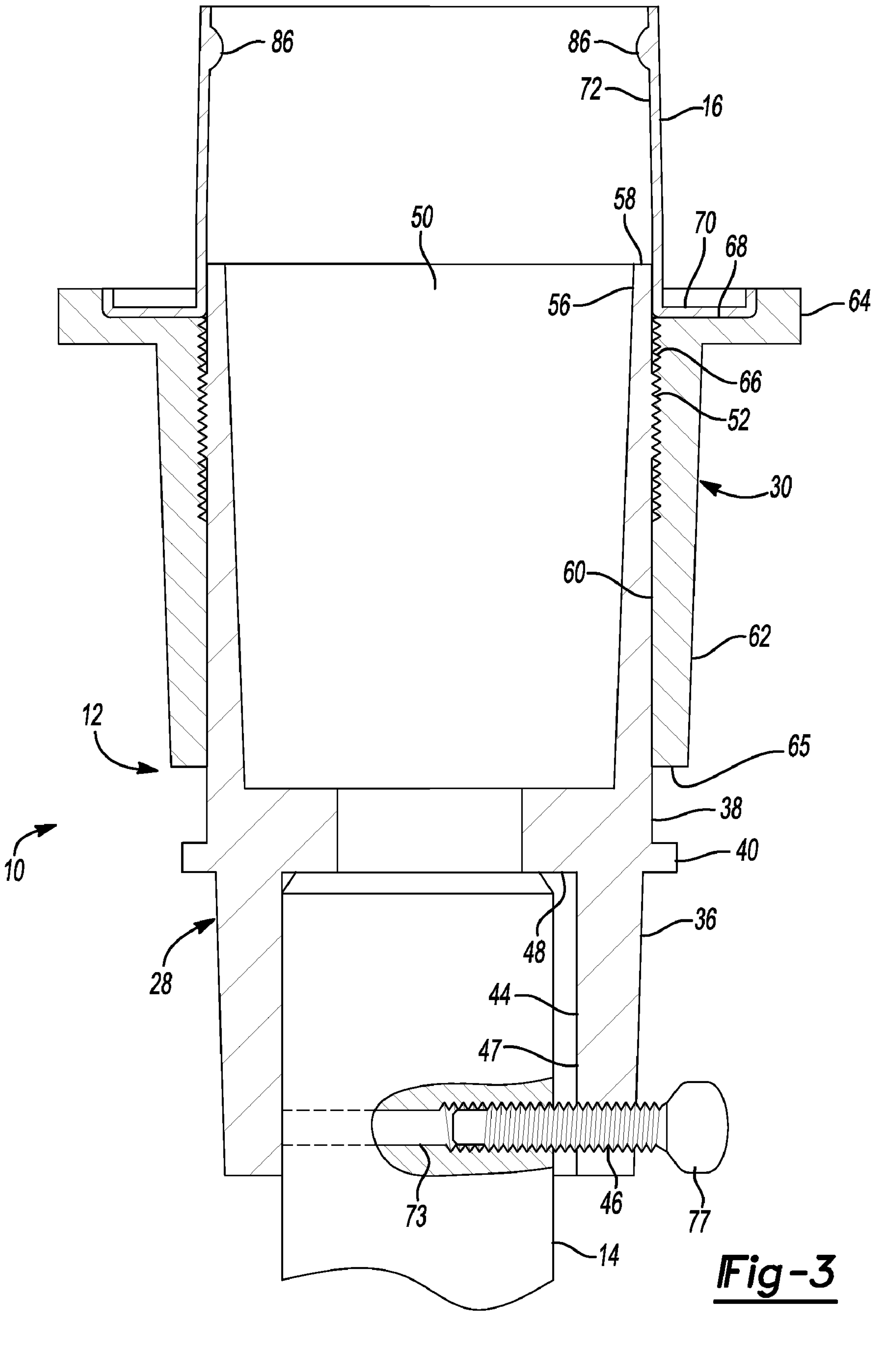
FIG. 3 is a partial cross-sectional view of the installation tool shown in FIG. 1 and having an escutcheon supported thereon ready for installation.
Figure 5:
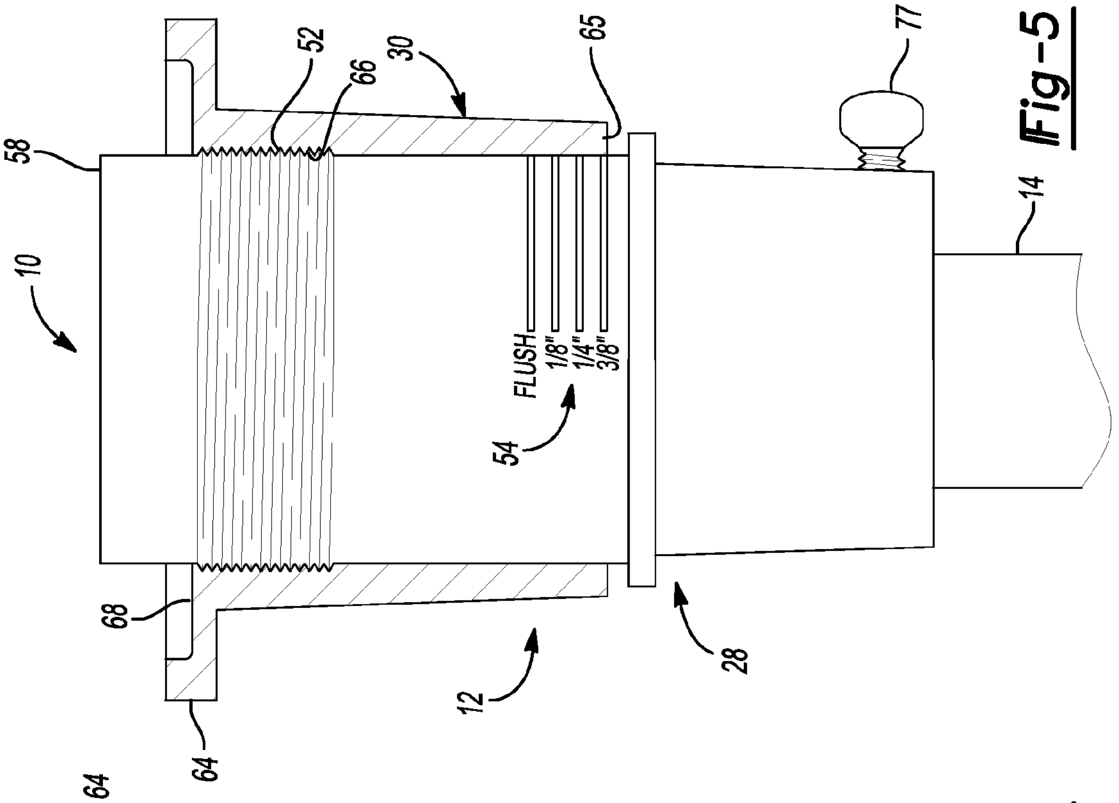
FIG. 5 is a partial cross-sectional view of the installation tool in a ⅜" depth position according to the principles of the present disclosure.

As shown in FIG. 3, the lower portion 36 may include a lower cavity 44 and an aperture 46 extending through the outer surface 42 and into the lower cavity 44. The lower cavity 44 is defined by an inner surface 47 and a wall 48. The wall 48 may be annular (FIGS. 3 and 6-8) or the wall 48 can be a solid face spanning the diameter of the inner surface 47. The extension member 14 may be received within the lower cavity 44 and may abut the wall 48.

The upper portion 38 of the base 28 may include an upper cavity 50, male threads 52 disposed around the outer surface 42, and a plurality of markings 54 disposed on the outer surface 42 to indicate a position of the body portion 12, as will be subsequently described. The upper cavity 50 may be defined by the wall 48 and a generally tubular inner surface 56. An end face 58 of the base 28 is disposed at an open end of the upper cavity 50 and may be generally perpendicular to the outer surface 42.

The markings 54 may include alpha-numeric text, symbols and/or lines printed, etched, or otherwise formed on the outer surface 42. For example, the base 28 may include markings 54 indicating a flush position, a ⅛ inch position, a ¼ inch position, a ⅜ inch position, and a plurality of lines corresponding to each position. Each of the lines may be spaced apart in ⅛ inch increments. It should be appreciated that the base 28 could include any number of markings 54 at increments of any suitable spacing.

The sleeve 30 may be generally tubular and may include an inner surface 60, an outer surface 62, an annular flange portion 64, and a bottom edge 65. The inner surface 60 may include a plurality of interior threads 66 which may threadably engage the exterior threads 52 disposed on the outer surface 42 of the base 28 such that the base 28 is received within the inner surface 60 of the sleeve 30. In this manner, the sleeve 30 is selectively threadably movable relative to the base 28 along a longitudinal axis of the installation tool 10 through a plurality of positions, including the flush position, the ⅛ inch position, the ¼ inch position, and the ⅜ inch position, for example.

Figure 4:
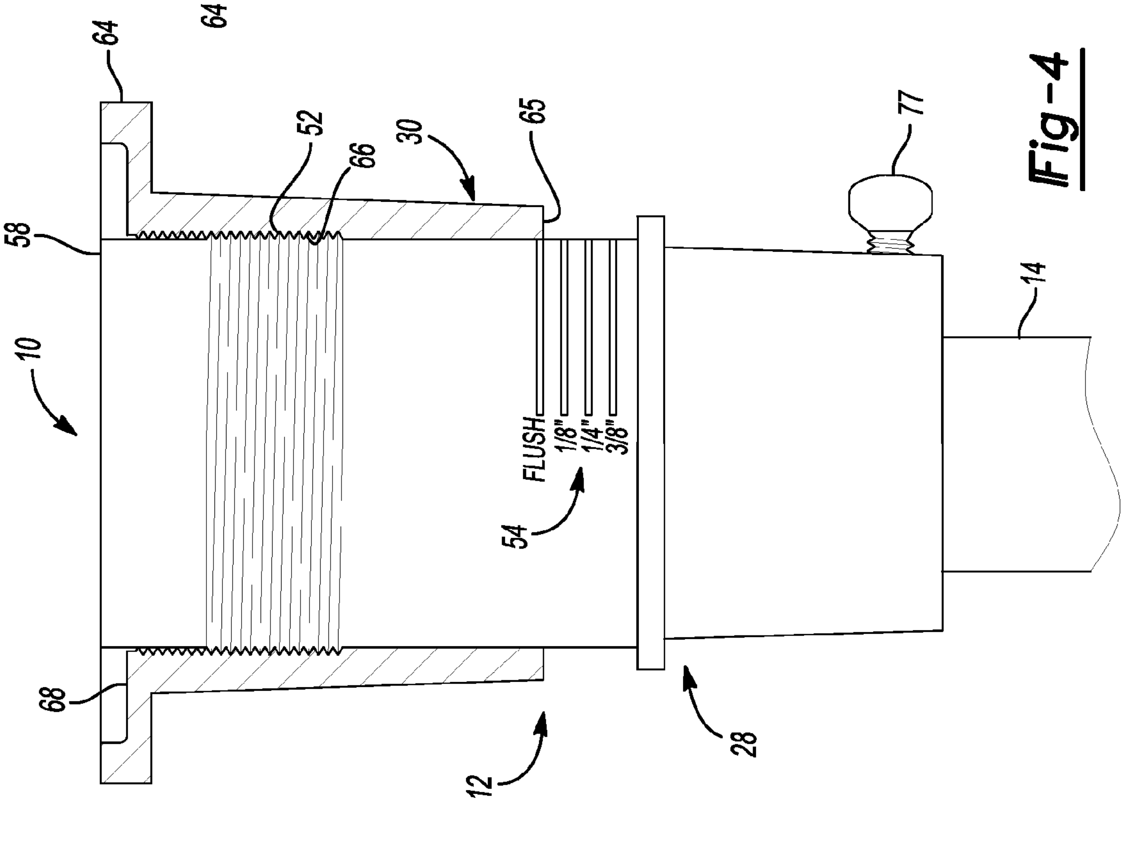
FIG. 4 is a partial cross-sectional view of the installation tool in a flush position according to the principles of the present disclosure.

The annular flange portion 64 of the sleeve 30 may include a recess 68 disposed around the inner surface 60. The recess 68 may releasably receive a rim portion 70 of the escutcheon 16, as shown in FIG. 3. In this manner, the base 28 is movable relative to the sleeve 30 and the escutcheon 16. The base 28 may be positioned such that the end face 58 of the base 28 may extend into a tubular portion 72 of the escutcheon 16, as shown in FIGS. 3 and 5-8. The base 28 can also be positioned such that the end face 58 is substantially flush with the upper surface of the rim portion 70 of the escutcheon 16, as shown in FIG. 4.

The extension member 14 may be an elongated rigid pole extending along the longitudinal axis of the installation tool 10 and may include an aperture 73 extending through a diameter of the extension member 14 generally perpendicular to the longitudinal axis X. The extension member 14 may also include one or more telescoping features 75, whereby the length of the extension member 14 may be expanded and/or contracted in the longitudinal direction as illustrated by arrow A in FIG. 1, to allow use with ceilings of various heights.

The extension member 14 may be received within the lower cavity 44 of the base 28, such that the apertures 46, 73 are disposed substantially concentric to each other (FIG. 3). In this configuration, a fastener 77 may be disposed through the apertures 46, 73, retaining the extension member 14 within the lower cavity 44. The fastener 77 may be threadably engaged with one or both of the apertures 46, 73 to retain the fastener 77 therein. Additionally or alternatively, the fastener 77 may be threadably engaged with a nut (not shown), for example, or the extension member 14 may be glued, press fit, threaded to or otherwise fixed to the body portion 12. The base 28 may be permanently fixed to the extension member 14 or integrally formed therewith.

Figure 6:
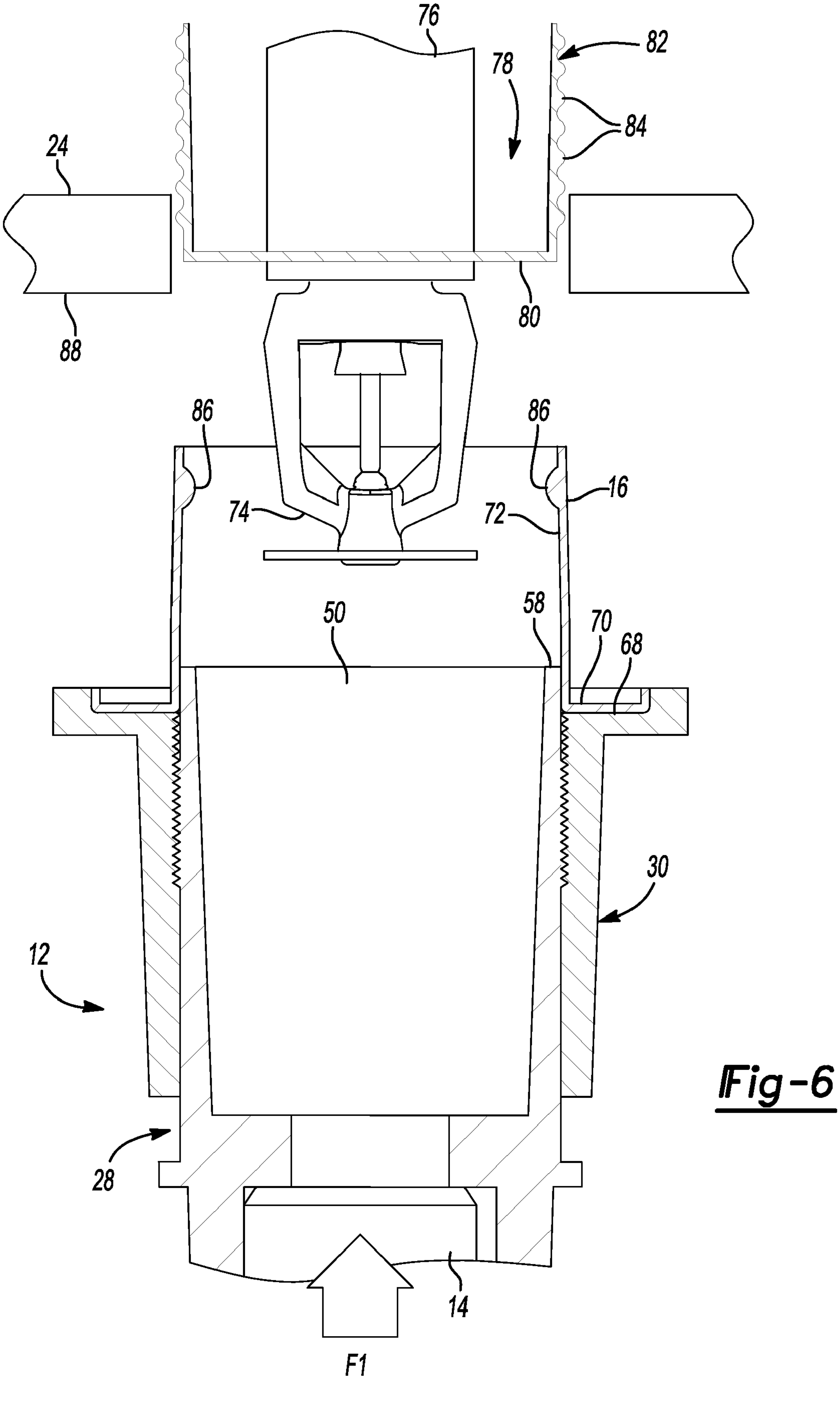
FIG. 6 is a partial cross-sectional view of the escutcheon being installed by the installation tool according to the principles of the present disclosure.
Figure 8:
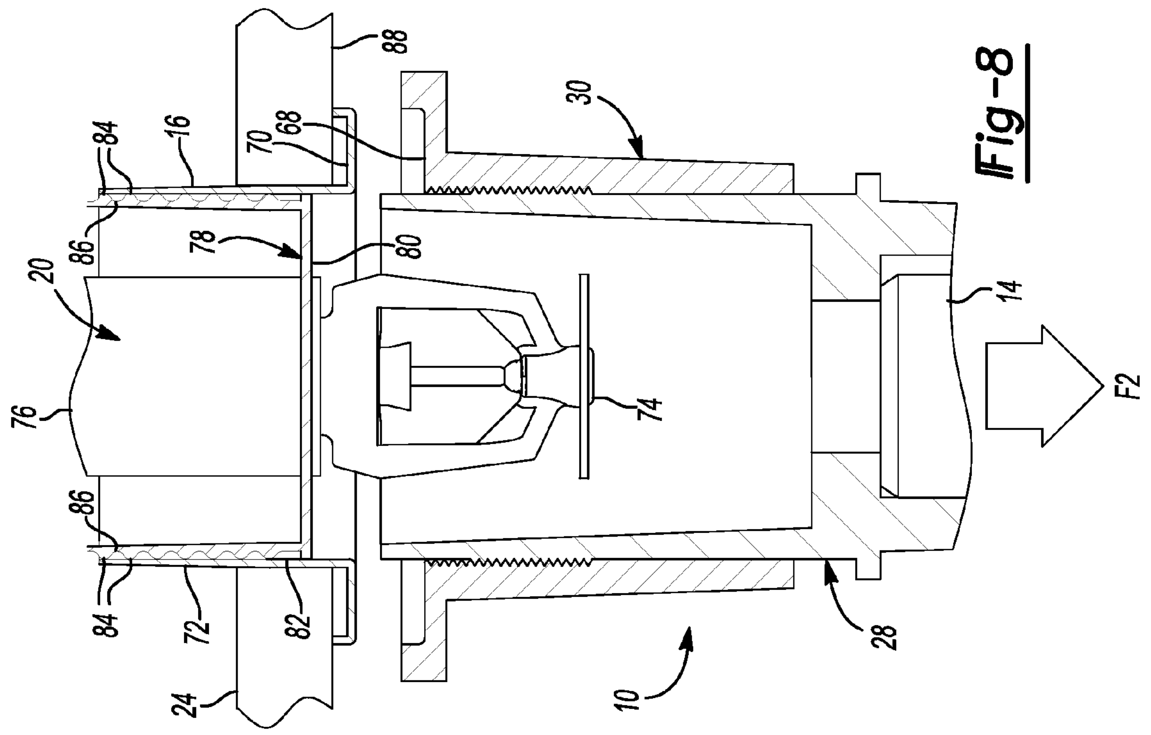
FIG. 8 is a partial cross-sectional view of the installation tool withdrawing from the installed escutcheon according to the principles of the present disclosure.
Figure 7:
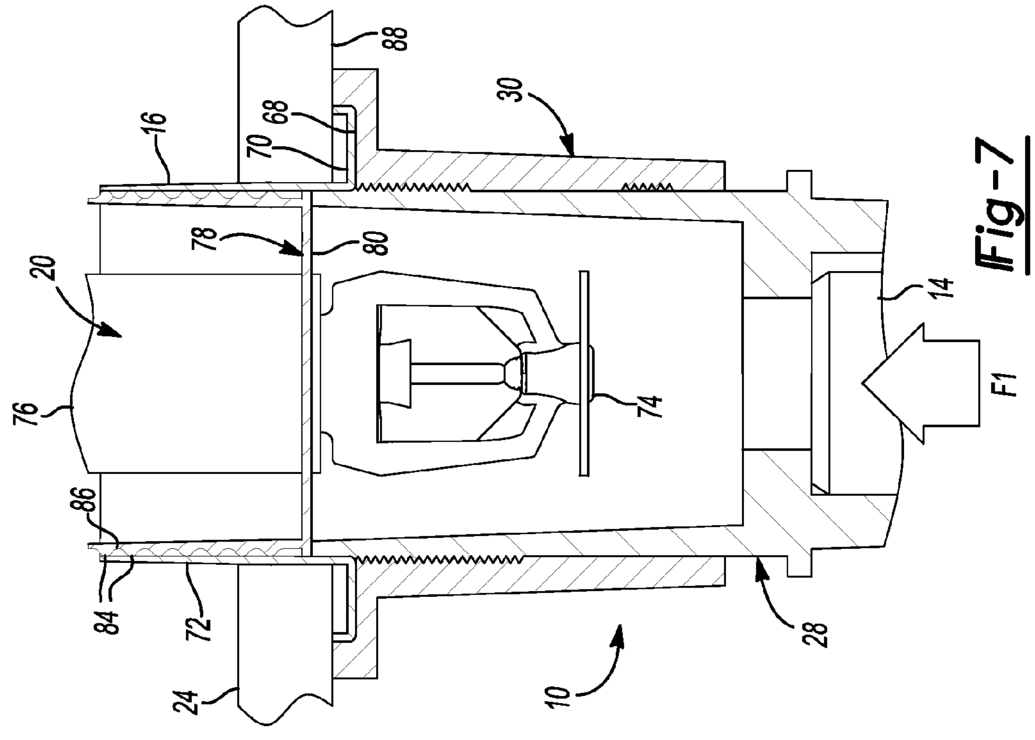
FIG. 7 is a partial cross-sectional view of the installation tool and the escutcheon in an installed position according to the principles of the present disclosure.

Referring now to FIGS. 6-8, the sprinkler assembly 20 may include a sprinkler head 74, a water pipe 76, and a cup 78 adapted to engage the tubular portion 72 of the escutcheon 16. The water pipe 76 delivers water to the sprinkler head 74. The sprinkler head 74 may protrude through the opening 22 of the ceiling 24. The sprinkler head 74 sprays water into a room of the building in response to heat from a fire, for example.

The cup 78 may have a generally U-shaped cross section including a downward-facing surface 80 and an outer circumferential surface 82. The outer circumferential surface 82 may include one or more ribs 84 adapted to engage one or more protuberances 86 disposed on an inner diameter of the tubular portion 72 of the escutcheon 16, thereby retaining the escutcheon 16 to the sprinkler assembly 20. It should be appreciated that the escutcheon 16 could engage the sprinkler assembly 20 by other suitable means known in the art.

The cup 78 may be disposed around the sprinkler head 74, the water pipe 76, or may be otherwise suitably fixed to the sprinkler assembly 20 proximate the opening 22 in the ceiling 24. The cup 78 is disposed substantially concentric to the opening 22. The downward-facing surface 80 of the cup 78 may be substantially flush with an interior-facing surface 88 of the ceiling 24. Alternatively, the downward-facing surface 80 of the cup 78 could located at any distance from the interior-facing surface 88 of the ceiling 24 such as, for example, ⅛ inch, ¼ inch, or ⅜ inch.

Referring now to FIGS. 1 and 4-8, operation of the installation tool 10 will be described in detail. The sleeve 30 may be threadably engaged with the base 28, as described above. The operator 18 may adjust the sleeve 30 relative to the base 28 to selectively arrange the body portion 12 in one of the plurality of positions indicated by the markings 54 by aligning the bottom edge 65 of the sleeve 30 with one of the lines corresponding to the Flush position, the ⅛" position, the ¼" position, or the ⅜" position. The operator 18 may select the position of the sleeve 30 relative to the base 28 based on the distance between the interior-facing surface 88 of the ceiling 24 and the downward-facing surface 80 of the cup 78. For example, if the interior-facing surface 88 is flush with the downward-facing surface 80, the operator 18 can move the sleeve 30 into the Flush position (FIG. 4). If the interior-facing surface 88 is disposed at a distance of ⅜" from the downward-facing surface 80, the operator 18 can move the sleeve into the ⅜" position (FIG. 5), for example.

The sleeve 30 may engage the escutcheon 16 such that the rim portion 70 is received within the recess 68 of the sleeve 30. It should be appreciated that the escutcheon 16 may be received within the sleeve 30 either before or after the operator 18 selects the appropriate position of the sleeve 30 relative to the base 28.

As shown in FIG. 1, the operator 18 may grasp the extension member 14 and raise the body portion 12 (with the escutcheon 16 releasably retained thereon) towards the sprinkler assembly 20 in the ceiling 24. The operator 18 then aligns the escutcheon 16 below the sprinkler assembly 20 along the longitudinal axis of the installation tool 10, as shown in FIG. 6. Next, an upward force F1 may be applied to the extension member 14 along the longitudinal axis thereof to remotely press the tubular portion 72 of the escutcheon 16 into engagement with the sprinkler assembly 20 (FIGS. 6 and 7). The force F1 may be sufficient to press the tubular portion 72 into engagement with the cup 78 such that the one or more protuberances 86 are engaged with the one or more ribs 84. The force F1 may be applied until the end face 58 of the base 28 contacts the downward-facing surface 80 of the cup 78, thereby placing the escutcheon 16 in an installed position (FIG. 7) such that the rim portion 70 of the escutcheon 16 is in contact with the interior-facing surface 88 of the ceiling 24 or disposed proximate thereto.

Once the escutcheon 16 is pressed into engagement with the sprinkler assembly 20, a downward force F2 may be applied to the extension member 14 along the longitudinal axis to withdraw the body portion 12 from the escutcheon 16 (FIG. 8). The escutcheon 16 remains in the installed position (FIGS. 7 and 8), as the installation tool 10 moves downward in response to the downward force F2.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An installation tool for installing an escutcheon on a sprinkler assembly comprising:

an extension member; and a body portion disposed on an end of said extension member, said body portion including a base adjustably engaging a sleeve, wherein said sleeve includes a radially extending surface and an axially extending flange extending from a periphery of said radially extending surface to define a recess adapted to releasably receive the escutcheon of the sprinkler assembly, wherein the escutcheon rests against the radially extending surface of said sleeve and within the axially extending flange.

2. The installation tool according to claim 1, wherein a force applied along a longitudinal axis of said extension member is operable to press said escutcheon into engagement with said sprinkler assembly.

3. The installation tool according to claim 1, wherein said base is threadably engaged with said sleeve and extends through said sleeve to protrude into said recess in said sleeve.

4. The installation tool according to claim 1, wherein said base includes a plurality of markings indicating a position of said sleeve on said base.

5. An installation tool for installing an escutcheon on a sprinkler assembly comprising:

an extension member; and a body portion disposed on an end of said extension member, said body portion including a base adjustably engaging a sleeve, wherein said sleeve includes a recess adapted to releasably receive the escutcheon of the sprinkler assembly;

wherein said base is adapted to retractably protrude through an aperture disposed in said recess, and to protrude through an aperture of the escutcheon which is received in said recess in said sleeve.

6. The installation tool according to claim 5, wherein said base and said sleeve are in telescoping engagement with each other.

7. The installation tool according to claim 1, wherein said end of said extension member is received within said base.

8. The installation tool according to claim 1, wherein a bolt disposed through said base is adapted to fixedly engage said body portion to said extension member.

9. The installation tool according to claim 1, wherein said extension member includes a telescoping feature adapted to adjust a length of said extension member.

10. A tool for installing an escutcheon onto a sprinkler assembly, the tool comprising:

an elongated extension member; and a body portion engaging said extension member, said body portion including a base and a sleeve, said sleeve threadably receiving said base, said sleeve being adjustable relative to said base to selectively arrange said body portion in any one of a plurality of positions, wherein said sleeve includes a recess in a distal surface thereof adapted to removably receive said escutcheon, and said body portion is adapted to force said escutcheon into fixed engagement with said sprinkler assembly, wherein said base is adapted to retractably protrude through an aperture disposed in said recess and extends beyond said distal surface of said sleeve to selectively arrange said body portion in one of said plurality of positions.

11. The tool for installing an escutcheon for a sprinkler according to claim 10, wherein said base portion includes a plurality of markings indicating a position of said body portion.

12. The tool for installing an escutcheon for a sprinkler according to claim 10, wherein said base is adapted to retractably protrude through an aperture disposed in said escutcheon.

13. The tool for installing an escutcheon for a sprinkler according to claim 10, wherein said extension member includes a telescoping feature adapted to adjust a length of said extension member.

14. The tool for installing an escutcheon for a sprinkler according to claim 10, wherein an end of said extension member is received within said base.

* * * * *